United States Patent [19]

Ikenoya et al.

[11] 4,417,442
[45] Nov. 29, 1983

[54] EXHAUST GAS CLEANING SYSTEM FOR AN INTERNAL COMBUSTION ENGINE

[75] Inventors: Yasuo Ikenoya, Kawagoe; Makoto Hirano, Asaka; Yoji Shimizu, Wako; Masaaki Matsuura, Tokyo, all of Japan

[73] Assignee: Honda Giken Kogyo Kabushiki Kaisha, Tokyo, Japan

[21] Appl. No.: 275,281

[22] Filed: Jun. 19, 1981

[30] Foreign Application Priority Data

Jun. 30, 1980 [JP] Japan ................................ 55-88948

[51] Int. Cl.³ .............................................. F01N 3/34
[52] U.S. Cl. ....................................... 60/293; 60/305
[58] Field of Search ................ 60/293, 274, 304, 305; 123/315

[56] References Cited

U.S. PATENT DOCUMENTS

| | | | |
|---|---|---|---|
| 3,869,859 | 3/1975 | Thornburgh | 60/305 |
| 3,965,678 | 6/1976 | Shiki | 60/305 |
| 4,083,184 | 4/1978 | Ushijima | 60/293 |
| 4,133,175 | 1/1979 | Katoh | 60/293 |

FOREIGN PATENT DOCUMENTS 431144  7/1935  United Kingdom ................ 123/315

Primary Examiner—Douglas Hart
Attorney, Agent, or Firm—Posnack, Roberts, Cohen & Spiecens

[57] ABSTRACT

An exhaust gas cleaning system for an internal combustion engine having a cylinder head with a plurality of exhaust valve ports therein associated with respective exhaust valves and an exhaust passage for discharge of exhaust gases to an exhaust system. The exhaust passage is constituted by a manifold exhaust port which is connected to the exhaust system and a plurality of branch ports which branch from the manifold exhaust port and communicate with respective exhaust valve ports. A secondary air passage is directly connected to the respective branch exhaust ports for supplying secondary air thereto in immediate proximity to the exhaust valves. Each secondary air passage is composed of a manifold secondary air passage opening externally of the cylinder head and branch secondary air passages branching from the manifold secondary air passage and communicating with the branch exhaust ports.

7 Claims, 8 Drawing Figures

EXHAUST GAS CLEANING SYSTEM FOR AN INTERNAL COMBUSTION ENGINE

FIELD OF THE INVENTION

The present invention relates to an exhaust gas cleaning system for internal combustion engines of vehicles and, more particularly, to an exhaust gas cleaning system of the type adapted to promote the burning of unburnt noxious substances in the exhaust gas by supplying secondary air to the exhaust system.

PRIOR ART

An exhaust gas cleaning system is known for introducing secondary air into the exhaust system to burn the unburnt noxious substances in the exhaust gases. In order for an exhaust gas cleaning system of this type to achieve a highly efficient cleaning, it is necessary for the secondary air to be mixed with the exhaust gases as uniformly as possible and for reburning to take place while the temperature of the exhaust gas is sufficiently high.

SUMMARY OF THE INVENTION

An object of the invention is to provide an exhaust gas cleaning system adapted to mix secondary air thoroughly with the exhaust gases and to effect secondary combustion at high temperature.

The present invention contemplates exhaust gas cleaning system suitable particularly for internal combustion engines of the type having a plurality of exhaust valve ports open to a single combustion chamber, a plurality of branch exhaust ports communicating with respective exhaust valve ports and a manifold exhaust port in which the branch exhaust ports merge, the exhaust gas cleaning system being capable of uniformly mixing the secondary air in the exhaust gas and effecting reburning while the exhaust gas is still hot, thereby to achieve the cleaning of the exhaust gas at a high efficiency.

DETAILED DESCRIPTION

Figure 1:
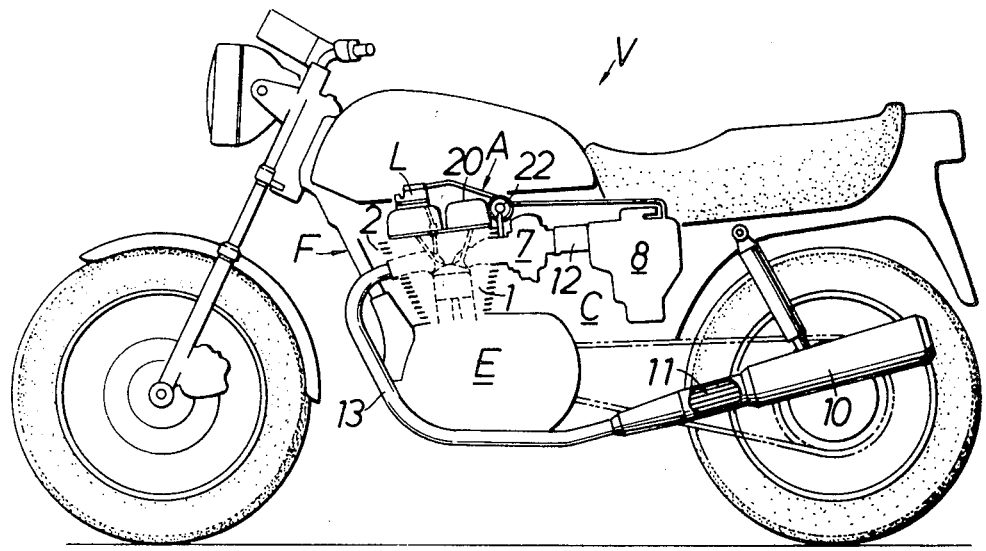
FIG. 1 is a side elevational view of a motorcycle on which is mounted an internal combustion engine provided with a secondary air supply system in accordance with a first embodiment of the present invention.

A first embodiment of the invention will be described hereafter with reference to FIGS. 1 to 5. Referring first to FIG. 1 therein is seen a motorcycle V which has a chassis or frame F carrying a multi-cylinder internal combustion engine E for driving the motorcycle. The engine E has a body 1 with a cylinder head 2. An intake port 5 communicating with a combustion chamber 4 above a piston 3 is formed in the rear half portion of the cylinder head 2, while an exhaust port 6 communicating with the combustion chamber 4 is formed in the front half portion of the cylinder head 2. The intake port 5 and the exhaust port 6 open at the rear side and the front side of the engine body 1, respectively. In addition, an intake pipe 12 having a carburetor 7 is connected to the intake port 5. An air cleaner 8 is connected to the rear end of the intake pipe 12. As will be seen from FIG. 4, the exhaust port 6 is constituted by a manifold exhaust port $6_1$ open to the outside and two branch exhaust ports $6_2$ connected to the manifold exhaust port $6_1$. An exhaust pipe 13 is connected to the outlet of the manifold exhaust port $6_1$. A muffler 10 is connected to the rear end of the exhaust pipe 13. A catalytic converter 11 for cleaning the exhaust gas by chemical reaction is mounted in an intermediate part of the muffler 10.

Two intake valve ports 14 and two exhaust valve ports 15 open into the combustion chamber 4.

Conventional intake and exhaust valves 16,17 are mounted to open and close the intake and exhaust valve ports 14,15 and are adapted to be actuated by cooperation between valve springs 18 and valve actuating mechanism 19. The cylinder head 2 is covered by a head cover 20.

Between the engine body 1 and the air cleaner 8, is a secondary air supply system A adapted for supplying secondary air to the exhaust port 6 for cleaning the exhaust gases.

The construction of the exhaust gas cleaning system will be described hereafter.

Figure 2:
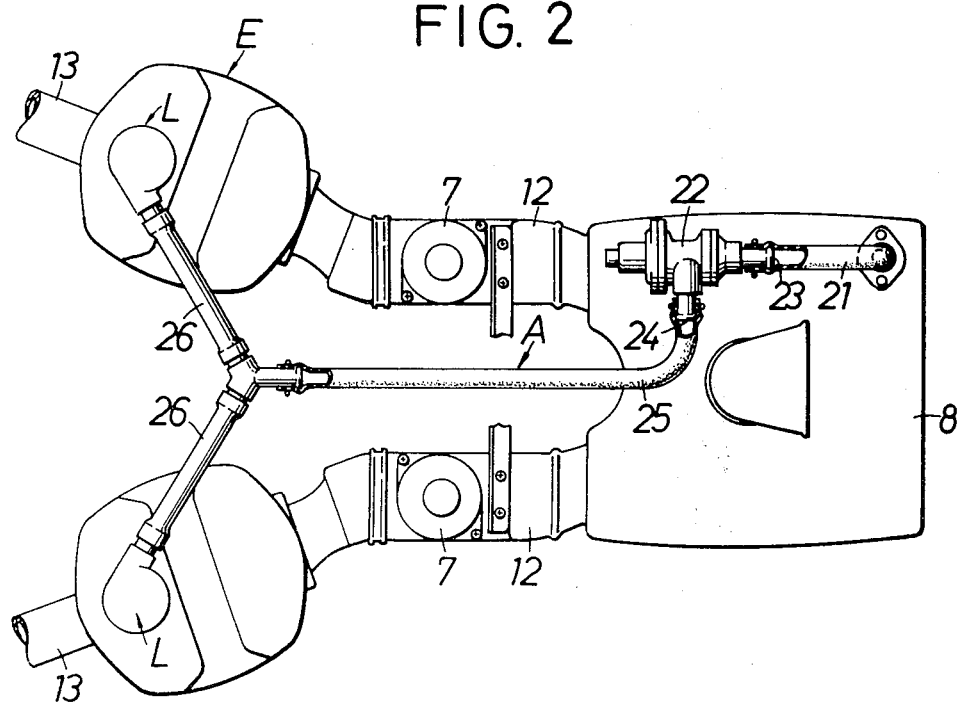
FIG. 2 is a plan view of the secondary air supply system.
Figure 3:
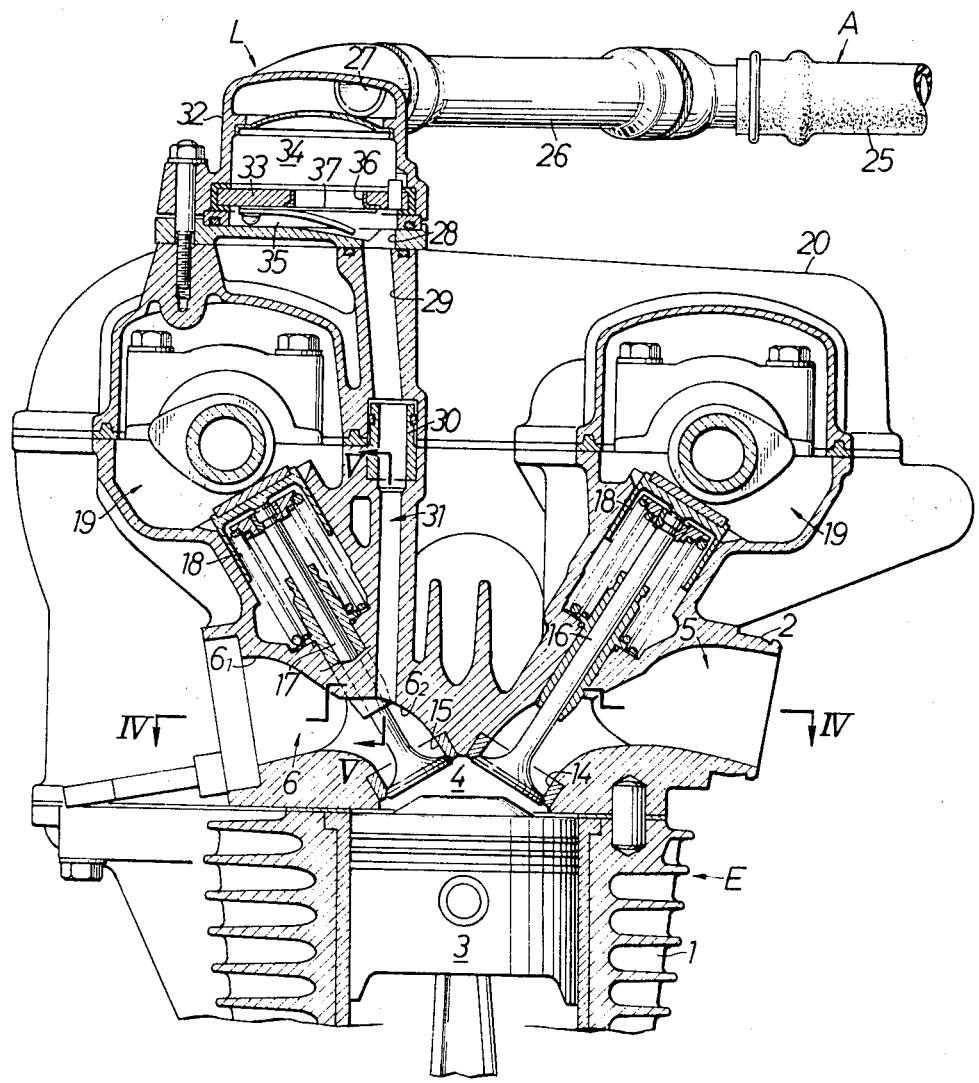
FIG. 3 is a sectional view through the head portion of the internal combustion engine.
Figure 4:
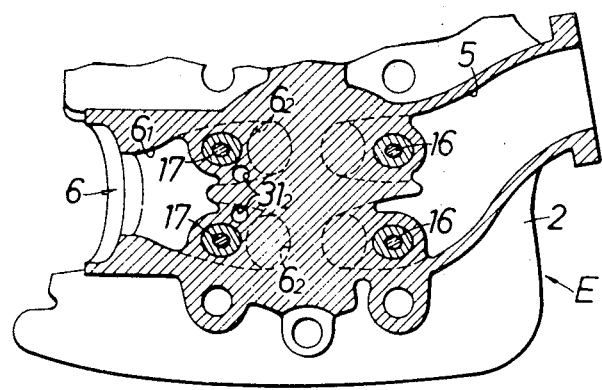
FIG. 4 is a sectional view taken along line IV—IV in FIG. 3.
Figure 5:
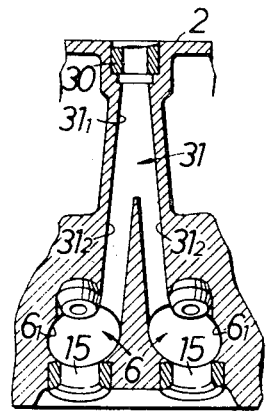
FIG. 5 is a sectional view taken along line V—V in FIG. 3.

As seen in FIG. 2, a secondary air outlet pipe 21 is connected at one end to a clean air chamber of the air cleaner 8. The secondary air outlet pipe 21 is connected at its opposite end to the inlet of a conventional air control valve 22 adapted to be opened in accordance with the operation of the internal combustion engine E. A secondary air supply pipe 25 is connected at one end to an outlet 24 of the air valve 22. The secondary air supply pipe 25 is divided into two branch pipes 26 which are connected to inlets 27 of reed valves L on the head cover 2. The reed valves L are mounted in correspondence with the cylinders of the engine body 1. The outlet 28 of each reed valve L is in communication with a secondary air passage 29 formed in the head cover 20. The secondary air passage 29 is connected through a connecting pipe 30 to a secondary air distribution passage 31 formed in the cylinder head 2. Namely, when head cover 20 is installed on the cylinder head 2, connection is established between passage 29 and passage 31 of the secondary air system through connecting pipe 30. As will be understood from FIG. 5, the secondary air distribution passage 31 is composed of a manifold secondary air passage distribution passage $31_1$ and two branch secondary air distribution passages $31_2$ branching from the manifold passage $31_1$. The branch secondary air distribution passages $31_2$ are in communication with the branch exhaust ports $6_2$ at locations near the exhaust valves 17.

The reed valve L comprises a valve housing 32 whose interior space is divided by reed valve 33 into an upstream chamber 34 communicating with the inlet 27 and a downstream chamber 35 communicating with the outlet 28.

The reed valve 33 has a valve port 36 and a reed 37 adapted to open and close the valve port 36. The reed 37 is adapted to allow the secondary air to flow only in the direction from the upstream chamber 34 to the downstream chamber 35. As a pulsating dynamic pressure is generated at the exhaust port 6 by the operation of the engine, the reed valve L is opened so that the secondary air introduced into the reed valve L is evenly distributed to the two exhaust ports $6_2$ through the secondary air passage 29 and the secondary air distribution passage 31.

The operation of the first embodiment of the invention will be described hereafter with reference to the accompanying drawings.

As the internal combustion engine operates, a pulsating dynamic pressure is generated at the exhaust port 6 and is transmitted through the secondary air distribution passage 31 and the secondary air passage 29 to the reed valve L to open the latter. Furthermore, while the air control valve 22 is opened in accordance with the operation of the engine, a part of the clean air in the air cleaner 8 is introduced into the two reed valves L through the secondary air outlet pipe 21, air control valve 22, secondary air supply pipe 25 and the branch passages 26, and further to the two branch exhaust ports $6_2$ near the exhaust valves 17, through the secondary air passage 29 and the secondary air distribution passage 31. Since the secondary air is introduced directly into the pair of branch exhaust ports $6_2$ open to common combustion chamber 4, the secondary air is mixed uniformly with the exhaust gases in the respective branch exhaust ports $6_2$. In addition, since the secondary air is introduced into the branch exhaust ports $6_2$ at a location near the exhaust valves 17, it is possible to mix the secondary air with the exhaust gases while the latter are sufficiently hot, so that reburning of the gases is promoted as a whole.

Figure 6:
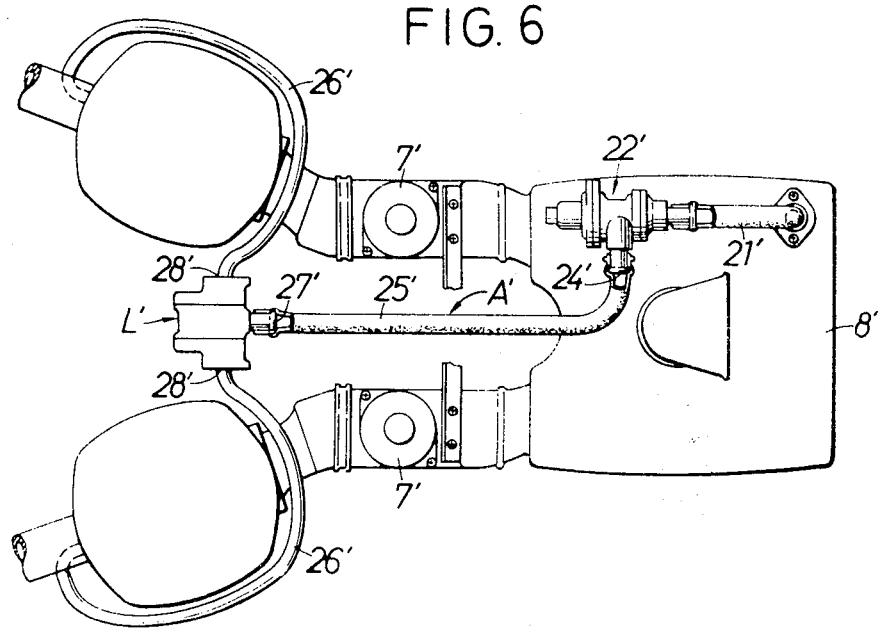
FIG. 6 is a plan view similar to FIG. 2 of a second embodiment of a secondary air supply system.
Figure 7:
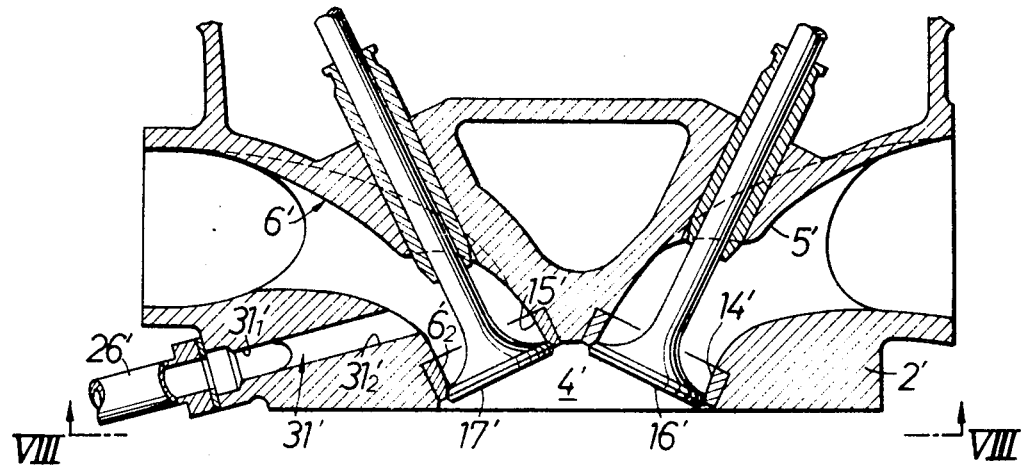
FIG. 7 is a sectional view through a modified cylinder head of the internal combustion engine.
Figure 8:
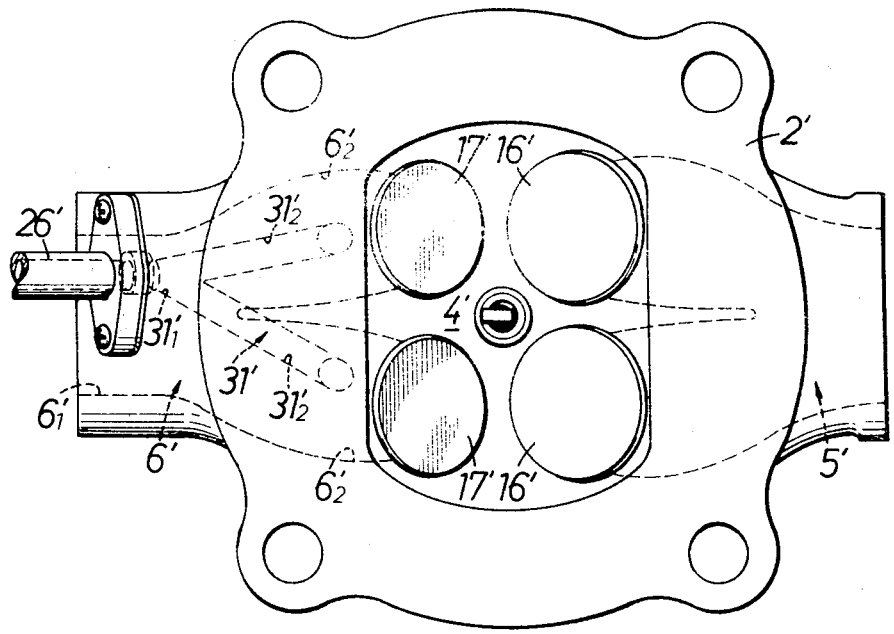
FIG. 8 is a bottom plan view as seen along line VIII—VIII in FIG. 7.

FIGS. 6 to 8 show a second embodiment of the invention. In these Figures, the same reference numerals with primes are used to denote the same elements as in the first embodiment.

In this embodiment, a secondary air distribution passage 31' is formed beneath the branch exhaust ports $6_2'$ of the exhaust port 6'. The secondary air distribution passage 31' is connected to respective branch exhaust ports $6_2'$ via branch secondary air distribution passages $31_2'$. Connected to a manifold secondary air passage $31_1'$ are branch pipes 26' which in turn are connected at their other ends to the outlets 28' of reed valves L'. The inlets 27' of the reed valves L' are connected to secondary air supply pipe 25' coming from air control valve 22'.

In FIGS. 7 and 8, reference numerals 5', 14' and 16' denote the intake port, intake valve port and an intake valve, respectively.

As has been described, according to the invention, there is provided an exhaust gas cleaning system A or A' of an internal combustion engine of the type having a plurality of exhaust valve ports 15 or 15' open to a common combustion chamber 4 or 4' and in communication with a main exhaust port $6_1$ or $6_1'$ through a plurality of branch exhaust ports $6_2$ or $6_2'$ branching from the main exhaust port, the exhaust gas cleaning system having a secondary air supply passage 31 or 31' communicating with the branch ports near the exhaust valve 17 or 17' so that the secondary air for reburning of the exhaust gas is directly supplied to the branch exhaust ports through the secondary air supply passage. In consequence, it is possible to form a uniform mixture of the secondary air and the exhaust gases in respective branch exhaust ports. In addition, since the secondary air is mixed with the exhaust gas while the latter is sufficiently hot, it is possible to reburn the unburnt substances of the exhaust gases at high efficiency and without fail.

In addition, since the secondary air distribution passage formed in the cylinder head branches into a plurality of branch passages which communicate with respective branch exhaust ports, it is possible to achieve the connection between the branch secondary air distribution passages and the corresponding branch exhaust ports in the engine body simply in the course of assembling of the engine body.

Furthermore, the construction of the secondary air supply system outside the engine body is simplified, and the number of parts is reduced to accomplish a reduction of the entire secondary air supply system and reduction of cost.

Although the invention has been described in relation to specific preferred embodiments thereof, it will become apparent to those skilled in the art that numerous modification and variations can be made within the scope and spirit of the invention as defined in the attached claims.

What is claimed is:

1. An exhaust gas cleaning system for an internal combustion engine comprising a plurality of cylinders with respective cylinder heads, a plurality of sets of exhaust valve ports provided in said cylinder heads, each set opening into a common combustion chamber of each of the cylinders, exhaust passage means in communication with respective exhaust valve ports, exhaust valves for opening and closing the exhaust valve ports, said exhaust passage means comprising a plurality of externally open manifold exhaust ports and a plurality of sets of branch exhaust ports each set of which branch from a related manifold exhaust port and communicate with a related set of exhaust valve ports, and secondary air passage means directly connected to respective branch exhaust ports for supplying secondary air thereto, said secondary air passage means including a passage in each of said cylinder heads composed of a manifold secondary air passage opening externally of the related cylinder head and a set of branch secondary air passages branching from said manifold secondary air passage and communicating with the related set of branch exhaust ports, each of said exhaust valves extending into a respective one of said branch exhaust ports, said branch secondary air passages opening into said branch exhaust ports at locations in proximity to the respective exhaust valves, said secondary air passage means further including reed valves each coupled to a related manifold secondary air passage for supplying secondary air to the related set of branch exhaust ports for mixture with exhaust gases thereat.

2. An exhaust gas cleaning system as claimed in claim 1 wherein said secondary air passage means further comprises a secondary air supply pipe and means connecting said secondary air supply pipe to said reed valves for supply of secondary air to the respective exhaust ports.

3. An exhaust gas cleaning system as claimed in claim 1 wherein said secondary air passage means further comprises a passageway connecting the respective reed valve with said related manifold secondary air passage.

4. An exhaust gas cleaning system as claimed in claim 3 wherein said engine includes a head cover mounted on a respective cylinder head, each said passageway of the secondary air passage means being provided in the respective said head cover.

5. An exhaust gas cleaning system as claimed in claim 4, comprising a connecting means joining each said passageway in the respective head cover and the manifold secondary air passage in the related cylinder head when the respective head cover is mounted on the related cylinder head.

6. An exhaust gas cleaning system as claimed in claim 1 wherein said secondary air passage means further comprises an external pipe connecting each of the reed valves with its related manifold secondary air passage.

7. An exhaust gas cleaning system as claimed in claim 1, wherein the cylinder head has front and rear sides, said exhaust passage means opening at the front side of the engine.

* * * * *